(12) United States Patent
Hooker

(10) Patent No.: US 12,463,494 B2
(45) Date of Patent: Nov. 4, 2025

(54) CONTROLLER AND CIRCUIT BOARD SUPPORT

(71) Applicant: Schaeffler Technologies AG & Co. KG, Herzogenaurach (DE)

(72) Inventor: Craig Hooker, Indian Land, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 237 days.

(21) Appl. No.: 18/201,413

(22) Filed: May 24, 2023

(65) Prior Publication Data

US 2023/0389212 A1 Nov. 30, 2023

Related U.S. Application Data

(60) Provisional application No. 63/346,356, filed on May 27, 2022.

(51) Int. Cl.
| | |
|---|---|
| H02G 15/04 | (2006.01) |
| F16H 1/10 | (2006.01) |
| F16H 19/08 | (2006.01) |
| F16H 55/08 | (2006.01) |
| F16H 55/17 | (2006.01) |
| F16H 57/02 | (2012.01) |
| F16H 57/023 | (2012.01) |
| F16H 57/029 | (2012.01) |
| H02G 3/06 | (2006.01) |
| H02G 15/013 | (2006.01) |
| B63B 39/06 | (2006.01) |

(Continued)

(52) U.S. Cl.
CPC ............ H02G 15/046 (2013.01); F16H 1/10 (2013.01); F16H 19/08 (2013.01); F16H 55/0833 (2013.01); F16H 55/17 (2013.01); F16H 57/02 (2013.01); F16H 57/023 (2013.01); F16H 57/029 (2013.01); H02G 3/0675 (2013.01); H02G 15/013 (2013.01); B63B 39/06 (2013.01); F16H 49/001 (2013.01); F16H 2055/176 (2013.01); F16H 2057/02008 (2013.01); F16H 2057/02034 (2013.01); F16H 2057/02082 (2013.01); G01D 5/245 (2013.01); H02K 5/10 (2013.01); H05K 7/1427 (2013.01)

(58) Field of Classification Search
None
See application file for complete search history.

(56) References Cited

U.S. PATENT DOCUMENTS

| | | |
|---|---|---|
| 3,924,555 A | 12/1975 | Napolitano |
| 4,092,946 A | 6/1978 | Kappas |

(Continued)

FOREIGN PATENT DOCUMENTS

| | | |
|---|---|---|
| CN | 208859035 U | 5/2019 |
| CN | 210920044 U | 7/2020 |

(Continued)

*Primary Examiner* — Timothy J. Dole
*Assistant Examiner* — Muhammed Azam
(74) *Attorney, Agent, or Firm* — Suiter Swantz IP

(57) ABSTRACT

A controller includes a plurality of circuit boards and a support configured to support each circuit board. The support includes a plurality of loading surfaces axially spaced from each other and a plurality of fingers extending obliquely relative to the loading surfaces. Each circuit board is disposed between one respective loading surface and one respective finger.

17 Claims, 3 Drawing Sheets

(51) Int. Cl.
  *F16H 49/00* (2006.01)
  *G01D 5/245* (2006.01)
  *H02K 5/10* (2006.01)
  *H05K 7/14* (2006.01)

(56) References Cited

U.S. PATENT DOCUMENTS

| | | | |
|---|---|---|---|
| 4,525,000 A | 6/1985 | Bachle | |
| 4,692,561 A | 9/1987 | Nattel | |
| 4,715,243 A | 12/1987 | Morishita et al. | |
| 5,093,984 A * | 3/1992 | Lape | H05K 13/0061 29/762 |
| 5,233,252 A * | 8/1993 | Denk | H02K 5/225 310/216.106 |
| 5,324,182 A | 6/1994 | Sabet et al. | |
| 5,920,035 A | 7/1999 | Haney et al. | |
| 6,268,565 B1 | 7/2001 | Daoud | |
| 6,310,455 B1 * | 10/2001 | Siraky | H02K 11/33 318/560 |
| 7,307,415 B2 * | 12/2007 | Seger | G01D 5/142 324/207.2 |
| 8,216,107 B2 | 7/2012 | Tao et al. | |
| 8,237,318 B2 * | 8/2012 | Ikitake | H02K 11/215 310/68 B |
| 8,490,513 B2 | 7/2013 | Chiou | |
| 8,979,590 B2 * | 3/2015 | Magno | H02G 15/076 439/607.41 |
| 9,814,128 B1 | 11/2017 | Wynar et al. | |
| 10,300,609 B2 * | 5/2019 | Jackowski | H02K 11/215 |
| 10,333,047 B2 * | 6/2019 | Gilbert | H01F 6/06 |
| 10,337,561 B2 * | 7/2019 | Jackowski | B25J 19/06 |
| 10,358,202 B2 | 7/2019 | Gil et al. | |
| 10,481,269 B2 * | 11/2019 | Pacala | G01S 17/931 |
| 10,483,823 B2 * | 11/2019 | Uematsu | H02K 11/38 |
| 10,563,742 B2 * | 2/2020 | Daniel | F16H 25/24 |
| 10,590,939 B2 * | 3/2020 | Wenger | H02K 7/14 |
| 10,625,831 B2 | 4/2020 | Venables et al. | |
| 10,658,900 B2 * | 5/2020 | Mackowiak | B60K 6/26 |
| 10,779,451 B2 * | 9/2020 | Knox | H05K 13/0408 |
| 10,890,242 B2 * | 1/2021 | Masuzawa | F16H 57/021 |
| 10,999,947 B2 * | 5/2021 | Katsuse | H05K 7/1427 |
| 11,439,028 B2 * | 9/2022 | Atsumi | B60R 16/02 |
| 11,511,803 B2 * | 11/2022 | Kobayashi | G01D 5/16 |
| 12,000,473 B2 | 6/2024 | Hisai et al. | |
| 12,110,955 B2 | 10/2024 | Mueller et al. | |
| 12,331,823 B2 * | 6/2025 | Hooker | F16H 57/02 |
| 2002/0186553 A1 | 12/2002 | Inoue et al. | |
| 2005/0253577 A1 | 11/2005 | Affaticati et al. | |
| 2011/0083880 A1 | 4/2011 | Shingin et al. | |
| 2011/0120073 A1 | 5/2011 | Flanary | |
| 2011/0201238 A1 | 8/2011 | Rott et al. | |
| 2012/0024590 A1 | 2/2012 | Chiou | |
| 2014/0030903 A1 | 1/2014 | Magno et al. | |
| 2015/0028236 A1 | 1/2015 | Dolenti et al. | |
| 2015/0083486 A1 | 3/2015 | Hill et al. | |
| 2015/0096436 A1 | 4/2015 | Venables et al. | |
| 2015/0137456 A1 | 5/2015 | Lund | |
| 2015/0330497 A1 * | 11/2015 | Amano | F16H 57/0497 74/89.41 |
| 2016/0121978 A1 | 5/2016 | Venables et al. | |
| 2016/0123002 A1 | 5/2016 | Münzenberger et al. | |
| 2018/0166942 A1 | 6/2018 | Aoi et al. | |
| 2018/0198351 A1 | 7/2018 | Akutsu et al. | |
| 2019/0346287 A1 * | 11/2019 | Koike | G01D 5/245 |
| 2020/0002992 A1 | 1/2020 | Sekine et al. | |
| 2021/0315121 A1 * | 10/2021 | Bettman | H05K 7/2039 |
| 2023/0209720 A1 * | 6/2023 | Knox | G01R 31/2805 118/712 |
| 2023/0389212 A1 * | 11/2023 | Hooker | F16H 57/02 |
| 2024/0088758 A1 * | 3/2024 | Yoshimi | B62D 5/04 |
| 2024/0401677 A1 * | 12/2024 | Hotta | F16H 57/031 |

FOREIGN PATENT DOCUMENTS

| | | |
|---|---|---|
| CN | 212744930 U | 3/2021 |
| CN | 118128880 A | 6/2024 |
| DE | 102016223820 A1 | 5/2018 |
| JP | 11307961 A | 11/1999 |
| JP | 2004032916 A | 1/2004 |
| JP | 2005080445 A | 3/2005 |
| JP | 2008057702 A | 3/2008 |
| JP | 2021025644 A | 2/2021 |
| KR | 20160127578 A | 11/2016 |
| KR | 20170084336 A | 7/2017 |
| KR | 20190127788 A | 11/2019 |
| WO | 2019021094 A1 | 1/2019 |
| WO | 2022101597 A1 | 5/2022 |
| WO | 2024209148 A1 | 10/2024 |

\* cited by examiner

CONTROLLER AND CIRCUIT BOARD SUPPORT

CROSS-REFERENCE TO RELATED APPLICATIONS

This application claims the benefit of U.S. Provisional Patent Application No. 63/346,356, filed May 27, 2022, the disclosure of which is incorporated in its entirety by reference herein.

TECHNICAL FIELD

The present disclosure relates generally to a controller for an actuator, and more specifically to a controller having a support configured to support and axially space a plurality of circuit boards.

BACKGROUND

An actuator may include a controller for controlling an angular position of an output shaft. The controller may comprise a plurality of circuit boards, e.g., including a power electronics circuit board and one or more circuit boards supporting sensors for detecting the angular position of the output shaft. Due to limited spacing within a housing of the actuator, it is desirable to have alternate designs and configurations to fit all necessary components within the housing while still meeting performance requirements.

SUMMARY

According to one embodiment, a controller includes a plurality of circuit boards and a support configured to support each circuit board. The support includes a plurality of loading surfaces axially spaced from each other and a plurality of fingers extending obliquely relative to the loading surfaces. Each circuit board is disposed between one respective loading surface and one respective finger.

In embodiments, the plurality of circuit boards may include a circuit board supporting a sensor and a power electronics circuit board spaced from the circuit board. The plurality of loading surfaces may include a first loading surface configured to support the circuit board and a second loading surface axially spaced from the first loading surface and configured to support the power electronics circuit board. The plurality of fingers may include a first finger disposed between the first and second loading surfaces and extending towards the first loading surface and a second finger spaced from the second loading surface and extending towards the second loading surface. The first finger may be configured to axially bias the circuit board against the first loading surface. The first finger may be configured to elastically deform during installation of the circuit board between the first finger and the first loading surface.

The second finger may be configured to prevent installation of the power electronics circuit board when components of the circuit board are not seated with mating components of the power electronics circuit board. The second finger may be configured to permit installation of the other circuit board when the components of the one circuit board are seated with mating components of the other circuit board. The second finger may be configured to permit axial movement of the power electronics circuit board relative to the second loading surface.

The plurality of circuit boards may include a further circuit board supporting a further sensor. The plurality of loading surfaces may include a third loading surface configured to support the further circuit board. The second loading surface may be disposed between the first and third loading surfaces. The plurality of fingers may include a third finger spaced from the third loading surface and extending towards the third loading surface. The third finger may be configured to axially bias the further circuit board against the third loading surface. The third finger may be configured to elastically deform during installation of the further circuit board between the third finger and the third loading surface. The second finger may be disposed between the second and third loading surfaces. The third finger may be disposed at an end of the support.

According to another embodiment, a circuit board support includes first and second loading surfaces and first and second fingers. The first loading surface is configured to support one circuit board. The second loading surface is axially spaced from the first loading surface and configured to support another circuit board. The first finger is disposed between the first and second loading surfaces and extending towards the first loading surface. The first finger is configured to axially bias the one circuit board against the first loading surface. The second finger is spaced from the second loading surface and extending towards the second loading surface. The second finger is configured to prevent installation of the other circuit board when components of the one circuit board are not seated with mating components of the other circuit board.

In embodiments, the first finger may be configured to elastically deform during installation of the one circuit board between the first finger and the first loading surface. The second finger may be configured to permit axial movement of the other circuit board relative to the second loading surface. The circuit board support may include a third loading surface configured to support a further circuit board. The circuit board support may include a third finger spaced from the third loading surface and extending towards the third loading surface. The third finger may be configured to axially bias the further circuit board against the third loading surface. The second loading surface may be disposed between the first and third loading surfaces. The second finger may be disposed between the second and third loading surfaces. The third finger may be configured to elastically deform during installation of the further circuit board between the third finger and the third loading surface. The third finger may be disposed at an end of the support.

Embodiments according to the present disclosure provide a circuit board support configured to support a plurality of circuit boards for envelopes with axial constraints. Further, the circuit board support axially constrains the circuit boards, which improves the likelihood of proper installation of the circuit boards.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

With reference to the Figures, a rotary actuator 100 is generally shown. The rotary actuator 100 includes a housing 102 and a plurality of components. The housing 102 houses the plurality of components of the rotary actuator 100. For example, each component of the rotary actuator 100 may be at least partially housed in the housing 102.

Figure 1:
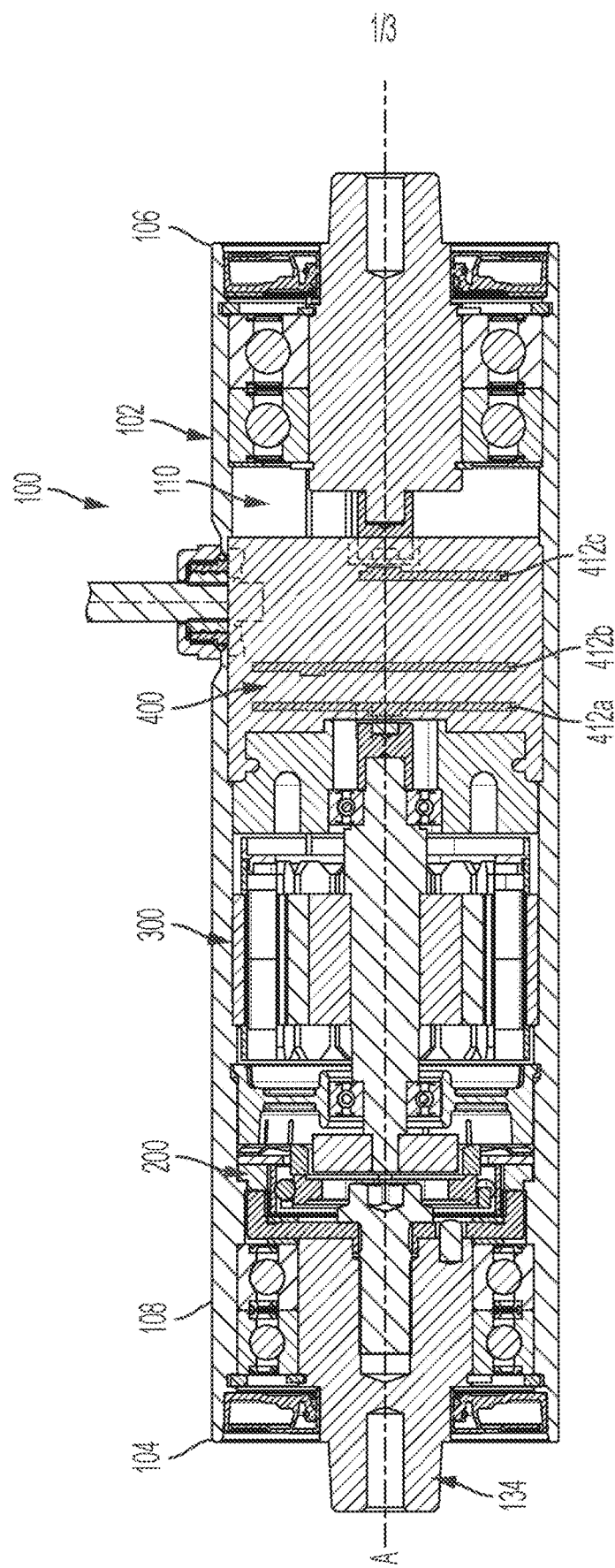
FIG. 1 illustrates a cross-sectional view along an axis of an exemplary rotary actuator.

With reference to FIG. 1, the housing 102 includes a first end 104 and a second end 106 spaced from the first end 104 along an axis A. The housing 102 includes a wall 108 extending along the axis A from the first end 104 to the second end 106. Additionally, the wall 108 extends annularly about the axis A. That is, the housing 102 has a tubular shape. The wall 108 defines a cavity 110 extending circumferentially about the axis A and axially along the axis A. The wall 108 may be elongated, i.e., have a longest linear dimension, from the first end 104 to the second end 106. The wall 108 is open at the first end 104 and the second end 106. That is, the cavity 110 extends along the axis A through the first end 104 of the housing 102 and through the second end 106 of the housing 102. The components of the rotary actuator 100 are inserted through one of the ends 104, 106 during assembly of the rotary actuator 100.

Figure 2:
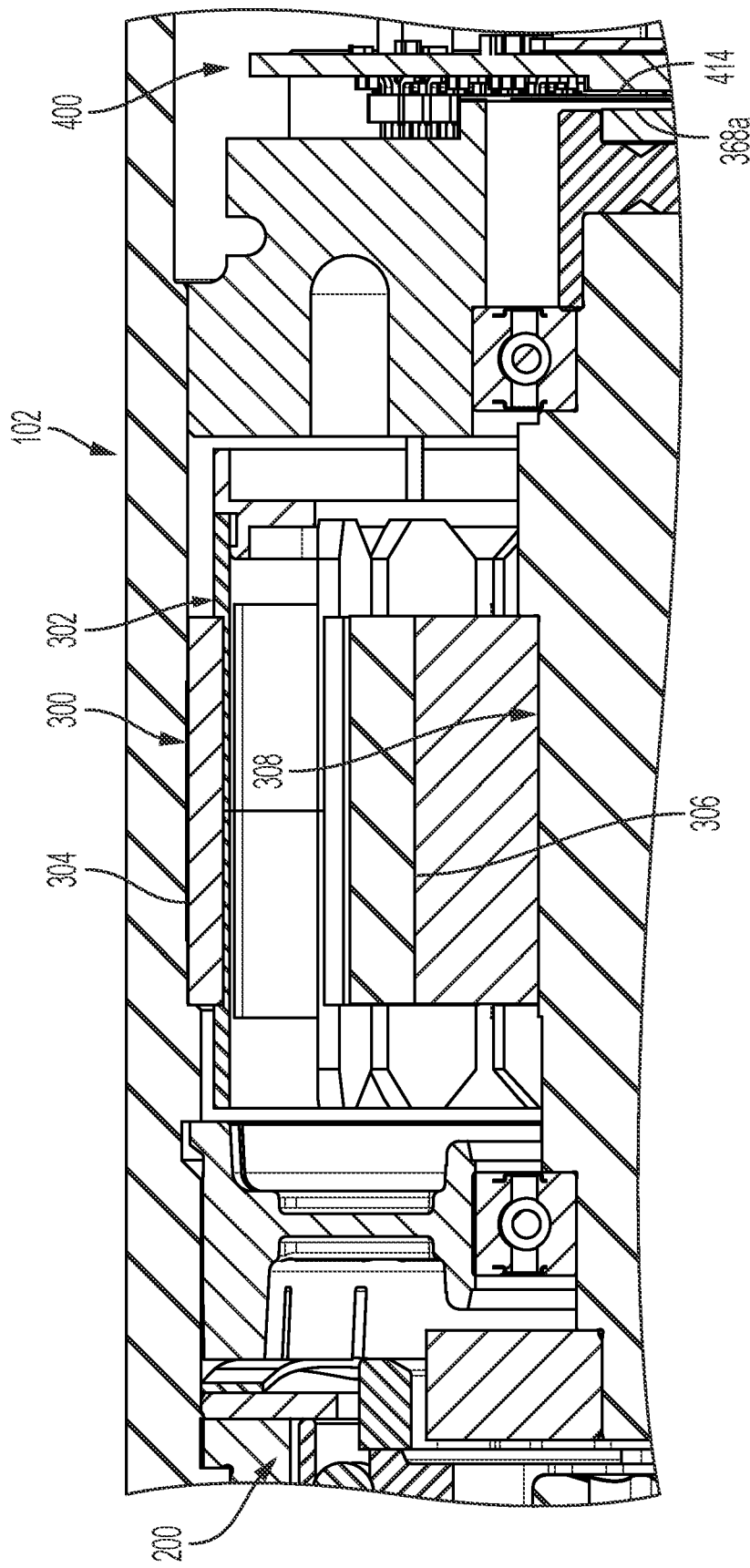
FIG. 2 illustrates a magnified cross-sectional view of another portion of the rotary actuator.

Turning now to FIG. 2, a drive system 300 is engaged with gearbox 200. The drive system 300 is disposed in the cavity 110. The gearbox 200 is disposed between an output shaft 134 and the drive system 300. The drive system 300 includes a motor 302. The motor 302 includes a fixed stator 304 and a rotatable rotor 306. The drive system 300 includes a rotor shaft 308 arranged coaxially with the axis A. The rotor 306 is non-rotatably connected to the rotor shaft 308, e.g., via a press-fit connection, adhesive, etc.

Figure 3:
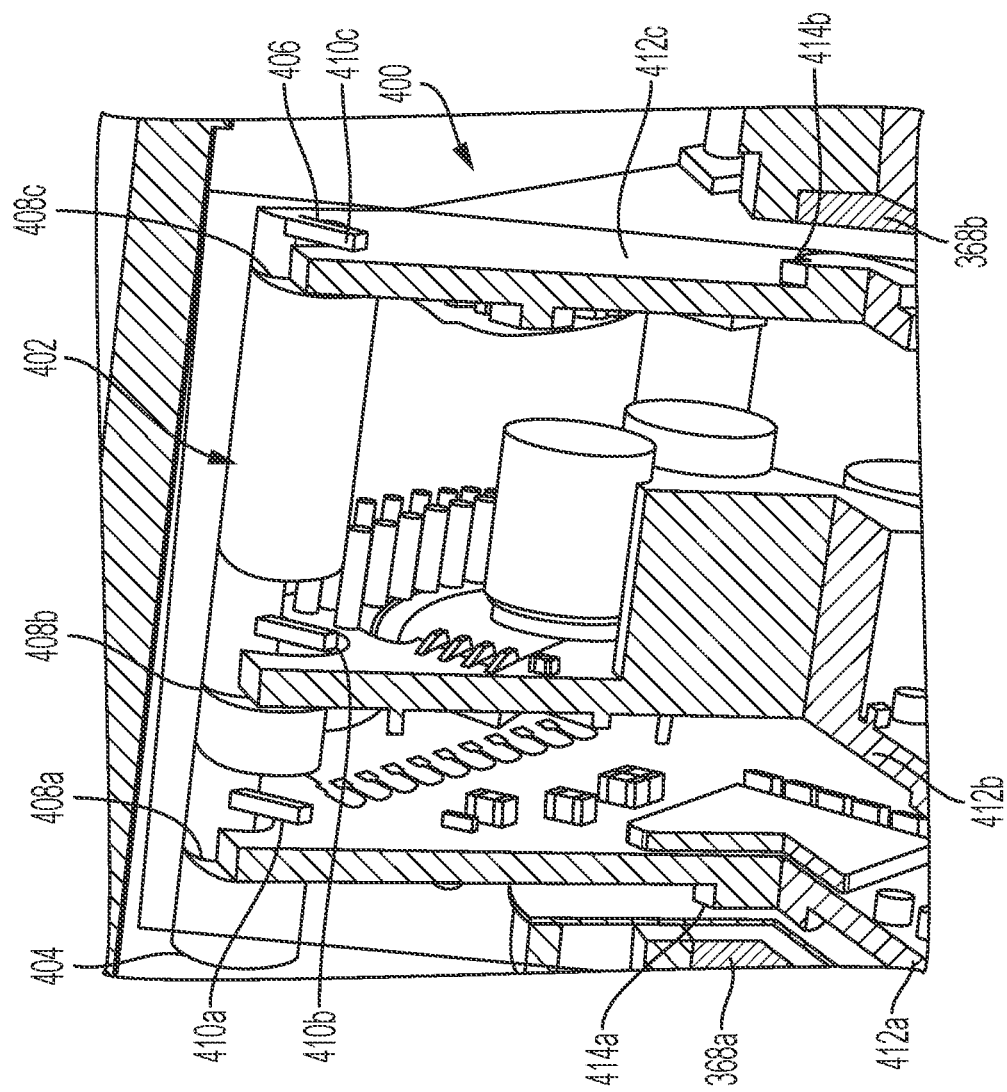
FIG. 3 illustrates a magnified cross-sectional view of another portion of the rotary actuator.

Turning now to FIG. 3, a rotational controller 400 is disposed between the drive system 300 and the second end 106 of the housing 102. That is, the rotational controller 400 is disposed in the cavity 110. The rotational controller 400 includes a computer 416 and the sensors 414 supported by a plurality of circuit boards 412.

A first circuit board 412a includes the first sensor 414a. Additionally, the first circuit board 412a may include the computer 416. Additionally, or alternatively, in cases where the computer 416 actually comprises a plurality of devices, the first circuit board 412a may include some of the devices represented as the computer 416.

The first sensor 414a is axially aligned with a first encoder magnet 368a. The first sensor 414a is an angular position sensor. Specifically, the first sensor 414a is configured to detect an angular position of the first encoder magnet 368a relative to the axis A. The first sensor 414a may be any suitable type of angular position sensor. For example, the first sensor 414a may be a Hall effect sensor configured to output a unique angular position over 360° of rotation about the axis A. In such an example, the Hall effect sensor can determine the angular position of the first encoder magnet 368a based on detecting a position of the poles relative to the axis A, e.g., according to known techniques.

The computer 416 includes a processor and a memory such as are known. The memory includes one or more forms of computer-readable media, and stores instructions executable by the processor for performing various operations, including as disclosed herein. The computer 416, i.e., the components thereof, may be supported by one or more of the circuit boards 412.

The computer 416 is generally arranged for communications on a communication network 418 via known wired and/or wireless mechanisms. Via the communication network 418, the computer 416 may transmit messages to various components in the rotary actuator 100 and/or receive messages from the various components, e.g., sensors 414, the motor 302, etc. Additionally, or alternatively, in cases where the computer 416 actually comprises a plurality of devices, the communication network 418 may be used for communications between devices represented as the computer 416. Further, as mentioned above, various controllers and/or sensors 414 may provide data to the computer 416 via the communication network 418. In addition, the computer 416 may be configured for communicating via a wired connection with devices outside of the rotary actuator 100.

A second circuit board 412b may be referred to as a power electronics circuit board. That is, the second circuit board 412b may include one or more devices, such as semiconductor switching devices, e.g., diodes, thyristors, power transistors, etc., a current converter device, etc., for controlling and converting electric power provided to the rotational controller 400, which allows the computer 416 to control the motor 302. Additionally, or alternatively, in cases where the computer 416 actually comprises a plurality of devices, the second circuit board 412b may include some of the devices represented as the computer 416.

A third circuit board 412c includes a second sensor 414b. The second sensor 414b may be substantially identical to the first sensor 414a. The third circuit board 412c may have a smaller surface area than the first circuit board 412a and/or the second circuit board 412b. Additionally, or alternatively, in cases where the computer 416 actually comprises a plurality of devices, the third circuit board 412c may include some of the devices represented as the computer 416.

A plurality of supports 402 support the circuit boards 412 within the cavity 110. The plurality of supports 402 are circumferentially spaced from each other about the axis A. Each support 402 includes a first end 404 and a second end 406 axially spaced from the first end 404. The first ends 404 are mounted, e.g., via a press-fit connection, to a component configured to support the controller 400. The supports 402 may be spaced from each other such that the supports 402 radially and circumferentially constrain the circuit boards 412. The supports 402 may be any suitable material, e.g., plastic.

Each support 402 may include a plurality of loading surfaces 408 spaced from each other along the axis A. Each loading surface 408 may be configured to axially support one respective circuit board 412. For example, each support 402 may include a same number of loading surfaces 408 as circuit boards 412. Each loading surface 408 may extend radially relative to the axis A. Each support 402 may include a plurality of fingers 410 axially spaced from each other along the axis A. Each finger 410 may extend obliquely towards the axis A. For example, each finger 410 may extend radially inward and axially towards one respective loading surface 408. Each support 402 may include a same number of fingers 410 as loading surfaces 408.

For example, each support 402 may include a first loading surface 408a spaced from the first end 404 and a first finger 410a spaced from the first loading surface 408a in the first direction. The first finger 410a extends towards the first loading surface 408a in the second direction, and radially inward towards the axis A. The first circuit board 412a may be disposed between the first loading surface 408a and the first finger 410a. Specifically, the first finger 410a can bias the first circuit board 412a against the first loading surface 408a. For example, the first finger 410a may be designed to elastically deform such that the first circuit boards 412a can be inserted between the first loading surface 408a and the first finger 410a. After installation, the first finger 410a can rebound and axially bias the first circuit boards 412a in the second direction to contact the first loading surface 408a.

The first loading surface 408a is spaced from the first end 404 such that the first sensor 414a is disposed within the predetermined range of the first encoder magnet 368a. The components of the rotary actuator 100 are axially constrained, as discussed herein, to maintain the first sensor 414a within the predetermined range of the first encoder magnet 368a. The predetermined range may be specified by a manufacturer of the sensor, e.g., based on empirical testing to determine a range in which the sensor 414a output satisfies a specified measurement accuracy and/or precision.

Each support 402 may include a second loading surface 408b axially spaced from the first finger 410a in the first direction. Additionally, each support 402 may include a second finger 410b axially spaced from the second loading surface 408b in the first direction. The second finger 410b may extend towards the second loading surface 408b in the second direction and radially inward towards the axis A. The second circuit board 412b may be disposed between the second loading surface 408b and the second finger 410b. The second finger 410b may be axially spaced from the second circuit board 412b. That is, the second finger 410b may permit axial movement of the second circuit board 412b relative to the second loading surface 408b. For example, the second finger 410b can be an assembly aid that permits the second circuit board 412b to be inserted between the second loading surface 408b and the second finger 410b when components of the first circuit board 412a are properly seated with mating components of the second circuit board 412b. Additionally, the second finger 410b can be an assembly aid that prevents the second circuit board 412b from being inserted between the second loading surface 408b and the second finger 410b when components of the first circuit board 412a are improperly seated with mating components of the second circuit board 412b.

Each support 402 may include a third loading surface 408c axially spaced from the second finger 410b in the first direction. Additionally, each support 402 may include a third finger 410c axially spaced from the third loading surface 408c in the first direction. The third finger 410c may be disposed at the second end 406. The third finger 410c may extend towards the third loading surface 408c in the second direction and radially inward towards the axis A. The third circuit board 412c may be disposed between the third loading surface 408c and the third finger 410c. Specifically, the third finger 410c can bias the third circuit board 412c against the third loading surface 408c. The third finger 410c can be substantially identical to the first finger 410a. The third loading surface 408c may be spaced from the first end 404 such that the second sensor 414b is disposed within the predetermined range of a second encoder magnet 368b.

An envelope for the controller 400 can be axially constrained by the encoder magnets 368a, 368b and the predetermined range. Providing supports 402 that axially space the circuit boards 412 and bias the circuit boards 412 onto respective loading surfaces 408 allows the controller 400 to be supported between the encoder magnets 368a, 368b while maintaining the sensors 414 within the predetermined ranges of the encoder magnets 368a, 368b.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LISTING OF REFERENCE CHARACTERISTICS 100 rotary actuator
102 housing
104 first end
106 second end
108 wall
110 cavity
134 output shaft
200 gearbox
300 drive system
302 motor
304 stator
306 rotor
308 rotor shaft
400 controller
402 supports
404 first end
406 second end 408 loading surfaces
410 fingers
412 circuit boards
414 sensors
416 computer
418 communication network
368a first encoder magnet
368b second encoder magnet
408a first loading surface
408b second loading surface
408c third loading surface
410a first finger
410b second finger
410c third finger
412a first circuit board
412b second circuit board
412c third circuit board
414a first sensor
414b second sensor
A axis

What is claimed is:

1. A controller, comprising:
a plurality of circuit boards; and
a support configured to support each circuit board, the support including a plurality of loading surfaces axially spaced from each other and a plurality of fingers extending obliquely relative to the plurality of loading surfaces;
the each circuit board disposed between one respective loading surface and one respective finger;
the plurality of circuit boards including a circuit board supporting a sensor and a power electronics circuit board spaced from the circuit board;
the plurality of loading surfaces including a first loading surface configured to support the circuit board and a second loading surface axially spaced from the first loading surface and configured to support the power electronics circuit board; and
the plurality of fingers includes a first finger disposed between the first and second loading surfaces and extending towards the first loading surface and a second finger spaced from the second loading surface and extending towards the second loading surface;
the first finger configured to axially bias the circuit board against the first loading surface;
the first finger configured to elastically deform during installation of the circuit board between the first finger and the first loading surface.

2. The controller of claim 1, wherein the second finger is configured to prevent installation of the power electronics circuit board when components of the circuit board are not seated with mating components of the power electronics circuit board.

3. The controller of claim 2, wherein the second finger is configured to permit installation of the other circuit board of the plurality of circuit boards when the components of the one circuit board of the plurality of circuit boards are seated with mating components of the other circuit board.

4. The controller of claim 1, wherein the second finger is configured to permit axial movement of the power electronics circuit board relative to the second loading surface.

5. The controller of claim 1, wherein: the plurality of circuit boards includes a further circuit board supporting a further sensor; the plurality of loading surfaces includes a third loading surface configured to support the further circuit board, the second loading surface being disposed between the first and third loading surfaces; and the plurality of fingers includes a third finger spaced from the third loading surface and extending towards the third loading surface.

6. The controller of claim 5, wherein the third finger is configured to axially bias the further circuit board against the third loading surface.

7. The controller of claim 6, wherein the third finger is configured to elastically deform during installation of the further circuit board between the third finger and the third loading surface.

8. The controller of claim 5, wherein the second finger is disposed between the second and third loading surfaces.

9. The controller of claim 5, wherein the third finger is disposed at an end of the support.

10. A circuit board support, comprising:
a first loading surface configured to support one circuit board;
a second loading surface axially spaced from the first loading surface and configured to support another circuit board;
a first finger disposed between the first and second loading surfaces and extending towards the first loading surface, the first finger being configured to axially bias the one circuit board against the first loading surface; and
a second finger spaced from the second loading surface and extending towards the second loading surface, the second finger being configured to prevent installation of the other circuit board when components of the one circuit board are not seated with mating components of the other circuit board.

11. The circuit board support of claim 10, wherein the first finger is configured to elastically deform during installation of the one circuit board between the first finger and the first loading surface.

12. The circuit board support of claim 10, wherein the second finger is configured to permit axial movement of the other circuit board relative to the second loading surface.

13. The circuit board support of claim 10, further comprising:
a third loading surface configured to support a further circuit board; and
a third finger spaced from the third loading surface and extending towards the third loading surface, the third finger being configured to axially bias the further circuit board against the third loading surface.

14. The circuit board support of claim 13, wherein the second loading surface is disposed between the first and third loading surfaces.

15. The circuit board support of claim 13, wherein the second finger is disposed between the second and third loading surfaces.

16. The circuit board support of claim 13, wherein the third finger is configured to elastically deform during installation of the further circuit board between the third finger and the third loading surface.

17. The circuit board support of claim 13, wherein the third finger is disposed at an end of the support.

* * * * *